United States Patent [19]

Williams

[11] Patent Number: 4,618,312
[45] Date of Patent: Oct. 21, 1986

[54] WIND OPERATED APPARATUS

[76] Inventor: Robert A. Williams, 2721 White Settlement Rd., Fort Worth, Tex. 76107

[21] Appl. No.: 695,726

[22] Filed: Jan. 28, 1985

[51] Int. Cl.⁴ ............................................. F03D 7/06
[52] U.S. Cl. ..................................... 416/119; 416/17
[58] Field of Search ........... 416/101, 119, 116, 112 A, 416/17, 87

[56] References Cited

U.S. PATENT DOCUMENTS

| | | | |
|---|---|---|---|
| 39,248 | 7/1863 | Scott | 416/116 |
| 65,539 | 6/1867 | Budd | 416/112 A |
| 1,293,262 | 2/1919 | Walker | 416/101 |
| 1,753,252 | 4/1930 | Strandgren | 416/112 A |
| 2,041,103 | 5/1936 | Zegers | 416/101 |
| 2,171,732 | 9/1939 | Michaelson et al. | 416/116 |
| 4,260,328 | 4/1981 | Hamel | 416/17 |
| 4,303,835 | 12/1981 | Bair | 416/17 X |
| 4,365,934 | 12/1982 | Mason | 416/17 |
| 4,410,806 | 10/1983 | Brulle | 416/17 X |
| 4,507,049 | 3/1985 | Strandgren | 416/17 X |

FOREIGN PATENT DOCUMENTS

| | | | |
|---|---|---|---|
| 2750254 | 5/1979 | Fed. Rep. of Germany | 416/101 |
| 2800551 | 7/1979 | Fed. Rep. of Germany | 416/101 |
| 2826180 | 12/1979 | Fed. Rep. of Germany | 416/17 |
| 633558 | 1/1928 | France | 416/101 |
| 2461119 | 3/1981 | France | 416/17 |
| 598756 | 10/1959 | Italy | 416/119 |

*Primary Examiner*—Everette A. Powell, Jr.
*Attorney, Agent, or Firm*—Arthur F. Zobal

[57] ABSTRACT

A frame supported for rotation about a central vertical axis has an enclosing cylindrical side wall with a plurality of openings formed therethrough at spaced apart angular position around the central axis. A plurality of vanes are located near the side walls for causing the frame to be rotated by the wind. Each vane is associated with one of the openings and is supported for pivotal movement such that it may be moved through its associated opening between an inward position inside the side wall and an outward position wherein it extends outward beyond the side wall. Cams located at the central axis and cam followers are provided for cyclically moving each of the vanes to its inward and outward positions as the frame rotates such that on one side of the central axis, the vanes are moved to their outward positions to catch the wind as the vanes are rotated by the frame to this side and on the opposite side of the central axis, the vanes are moved to their inward positions out of the wind as the vanes are rotated by the frame to the opposite side.

31 Claims, 17 Drawing Figures

WIND OPERATED APPARATUS

BACKGROUND OF THE INVENTION

1. Field of the Invention

The invention relates to an apparatus to be rotated by the wind for performing work.

2. Description of the Prior Art

Many different types of devices having vanes rotated by the wind are available for performing work, such as generating electricity, etc. The known devices, however, are inefficient since the vanes of these devices are always exposed to the wind.

SUMMARY OF THE INVENTION

It is an object of the invention to provide a new and useful apparatus having vanes for causing the wind to rotate the apparatus. As the apparatus is rotated, the vanes are moved into the wind on one side of the axis of the apparatus and then are moved out of the wind on the other side.

The apparatus comprises a frame; means for supporting said frame for rotation about a central axis; an enclosing side wall supported by said frame; a plurality of openings formed through said side wall at spaced apart angular positions around said central axis; and a plurality of vane means located at spaced apart angular positions around said central axis near said enclosing side wall for causing said frame to be rotated by the wind. Each of said vane means is associated with one of said openings and is supported for pivotal movement relative to said frame such that it may be moved through its associated opening between inward and outward positions on opposite sides of said enclosing side wall. Control means is provided for cyclically moving each of said vane means to its inward and outward positions as said frame rotates such that on one side of said central axis said vane means are moved to their outward positions as said vane means are rotated by said frame to said one side and on the opposite side of said central axis said vane means are moved to their inward positions as said vane means are rotated by said frame to said other side.

In another aspect, sensing means is provided for sensing the direction of the wind. In addition, means is provided responsive to the change in the direction of the wind as sensed by said sensing means for changing the positions relative to said central axis at which said vane means are moved to their inward and outward positions as said frame rotates.

The control means comprises cam means located at said central axis; a plurality of cam follower means coupled to said frame for rotation therewith; each of said cam follower means being associated with one of said vane means; and linkage means pivotally coupled to each of said cam follower means and to its associated vane means. Said cam means is rotated to a new angular position about said central axis as the wind direction changes in order to change the positions at which said vane means are moved to their inward and outward positions relative to said central axis as said frame rotates.

DESCRIPTION OF THE PREFERRED EMBODIMENT

Figures 1, 2:
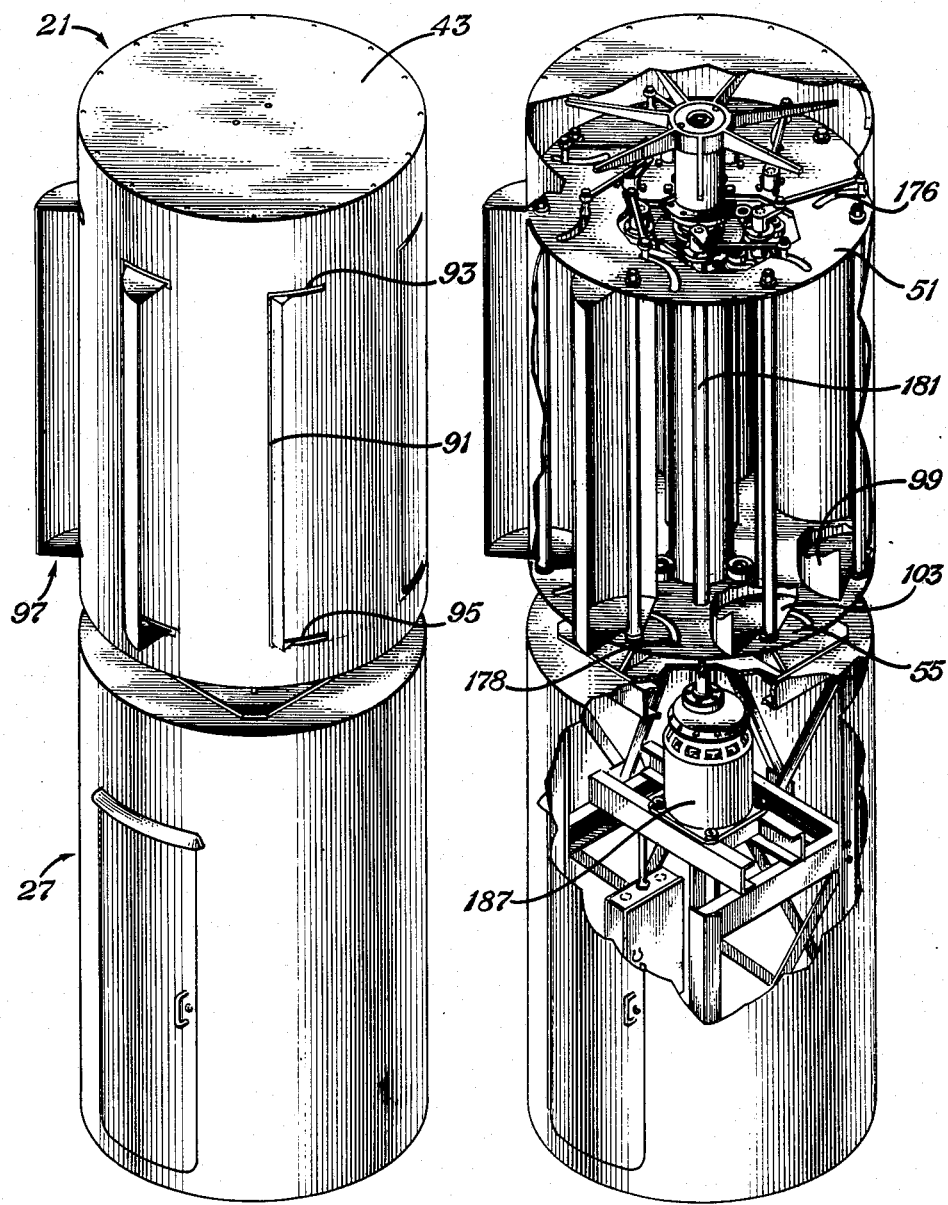
FIG. 1 is a perspective view of one embodiment of the invention.
FIG. 2 is a partial cross-section of FIG. 1.

Referring to FIGS. 1–5 of the drawings, the apparatus of the invention comprises an enclosed cylindrical member 21 supported by a base member 23 for rotation about a vertical axis 25. In FIGS. 1 and 2, the base member 23 is supported by a lower housing 27. The cylindrical member 21 comprises a frame formed by a hub 31 which is attached to the shaft 33. The hub 31 has a central aperture 35 with a slot 36 and the shaft 33 is located in the aperture 35 with a key 37 extending from the shaft which is fitted into the slot 36 to prevent the hub 31 from turning relative to the shaft 33. Nuts 39 secure the hub to the shaft. The upper end of the hub 31 has spokes 41 which are attached to a top circular plate 43. The lower end of the hub 31 has a flange 45 which is attached by bolts 47 to round plates 49 and 51. A cylindrical side wall 53 is attached to plates 43 and 51 and to a lower round plate 55.

Shaft 33 is fixedly attached to a member 61 which is supported for rotation about the vertical axis 25 by bearings 63 and 65 which are carried by member 77. Member 77 is attached to and supported by an inner cylindrical member 79. The lower end of member of 79 is connected to the base 23. Triangular support plates 81 are connected to member 79 and to the base 23. Although not shown, lower bearings will be provided for the shaft 33.

Thus, the shaft 33, hub 31, upper, intermediate, and lower plates 43, 51 and 55 and surrounding cylindrical wall 53 are supported by rotation about the vertical axis 25. Lower plate 55 has a smaller diameter plate 82 attached thereto and both the plates 55 and 82 support rollers 83 which roll against the inner cylindrical member 79 as the enclosed cylindrical member 21 rotates.

Formed throught the cylindrical wall 53 at equally spaced apart angular positions around the axis 25 are seven vertical slits 91, each of which has an upper and lower short horizontal slits 93 and 95 extending therefrom and formed through the wall 53. Seven buckets or vanes 97 are supported to pass through the seven slits 91, 93, 95 respectively. Thus, each vane 97 is associated with one slit 91, 93, 95.

Figure 3:
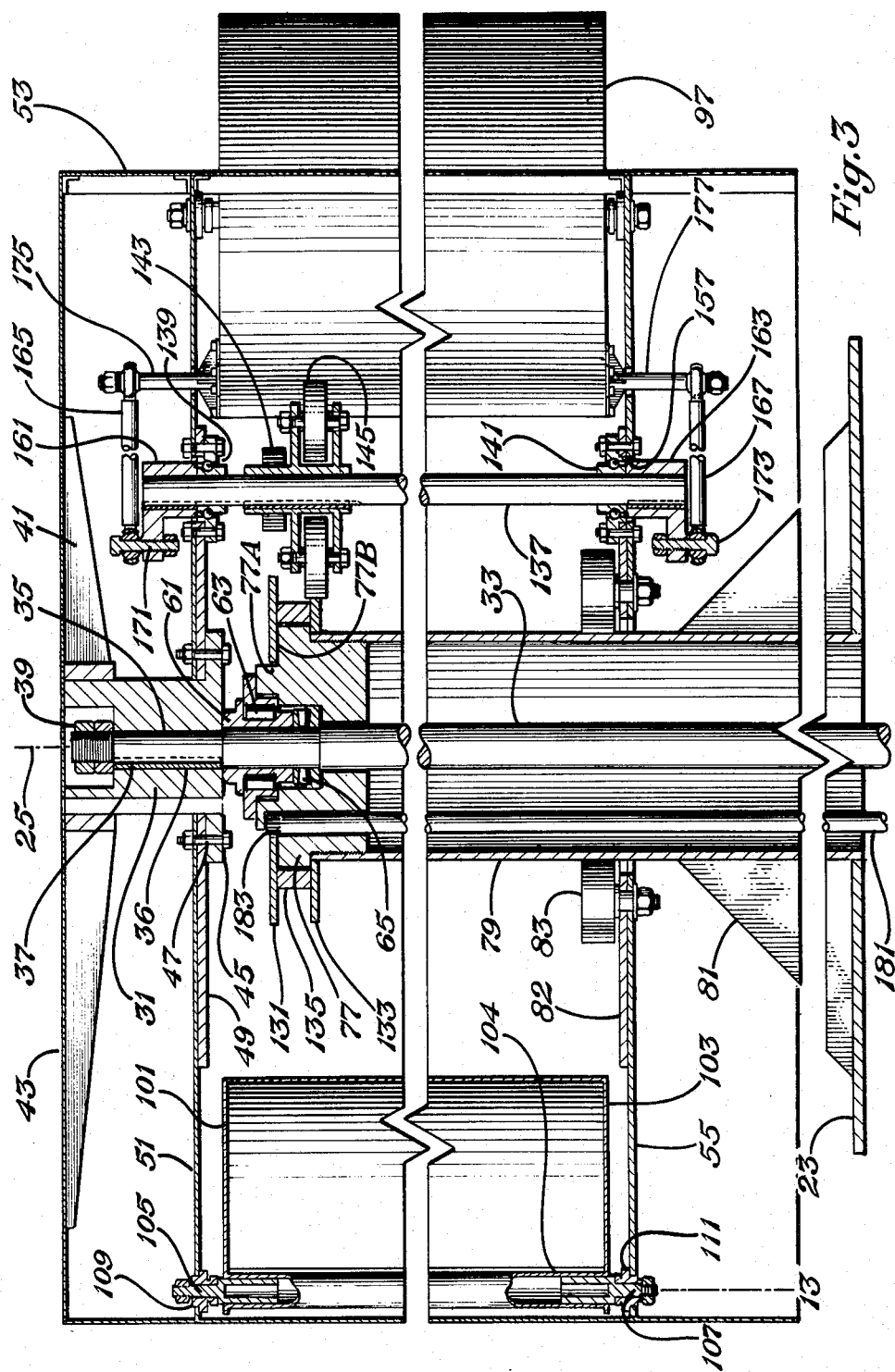
FIG. 3 is a partial cross-section side view of the rotating apparatus of FIGS. 1 and 2.
Figure 9:
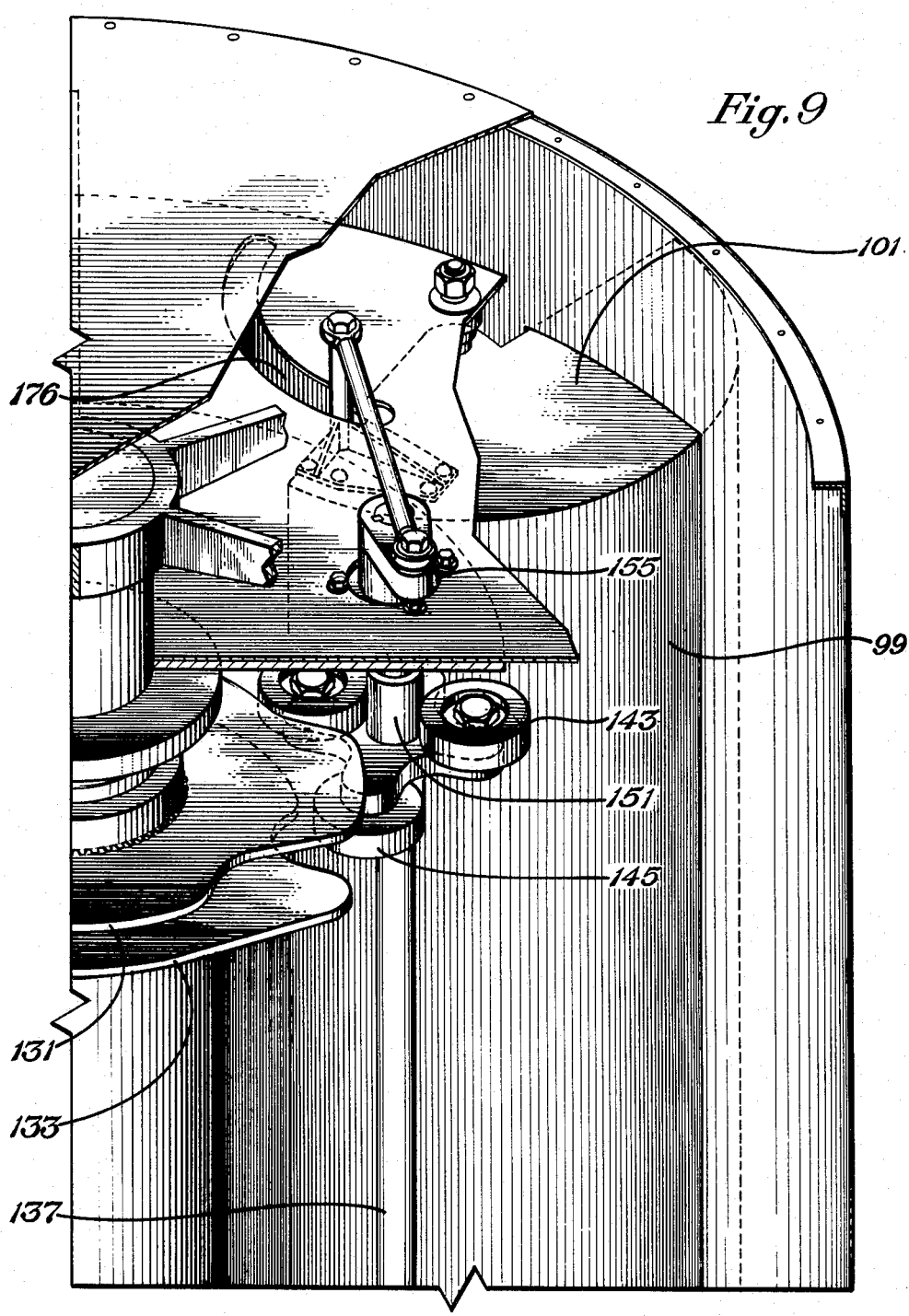
FIG. 9 is a partial cross-sectional view of the central cams and one of the cam followers and linkage of one of the vanes of the embodiment of FIGS. 2 and 3.

In the embodiments of FIGS. 2, 3, and 9, each of the vanes 97 has a rounded side wall 99, which is semi-circular, and top and bottom walls 101 and 103. The top and bottom walls 101 and 103 of each vane 97 have a tube 104 attached thereto and in which is secured upper and lower shaft members 105 and 107. The tube 104 of each vane 97 is attached thereto at about the center of the axis of the semi-circular walls 101 and 103. Shaft members 105 and 107 are pivotally coupled to plates 51 and 55 by way of bearings 109 and 111 for movement about a vertical axis 113 which rotates with the enclosed member 21. Each of the axis 113 is located inside and near the cylindrical wall 53 such that the vanes 97 may be moved through their slits 91, 93, 95 to an inward position inside of the wall 53 and to an outward position beyond the wall 53 as shown in FIGS. 2, 3, and 9. At the inward positions, the vanes 97 are inside the wall 53 out of the wind and at the outward positions, the vanes 97 are exposed to the wind such that the wind may blow against the vanes and rotate the rotatable member 21. Since the wall 53 is cylindrical in shape, it presents a neutral surface and offers a minimum of resistance to the wind.

Figure 4:
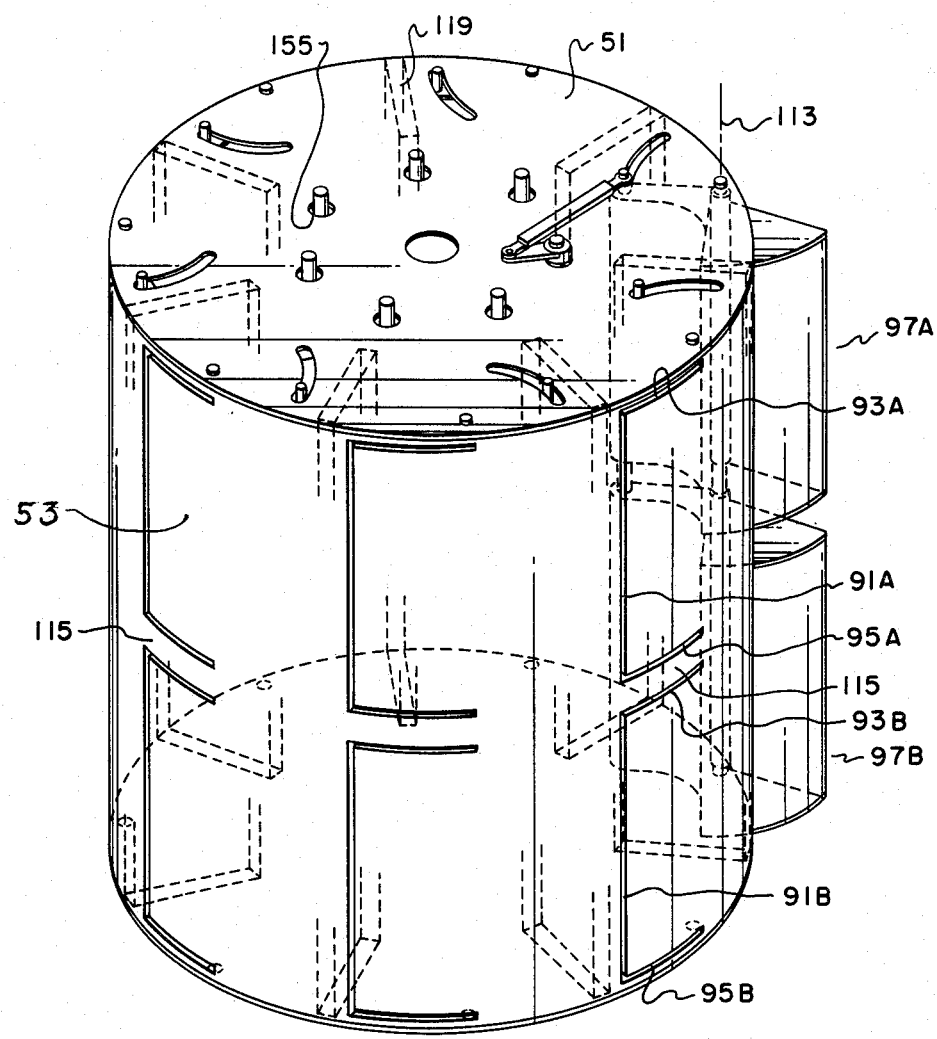
FIG. 4 is a perspective view of another embodiment of the rotating apparatus of the invention.
Figure 5:
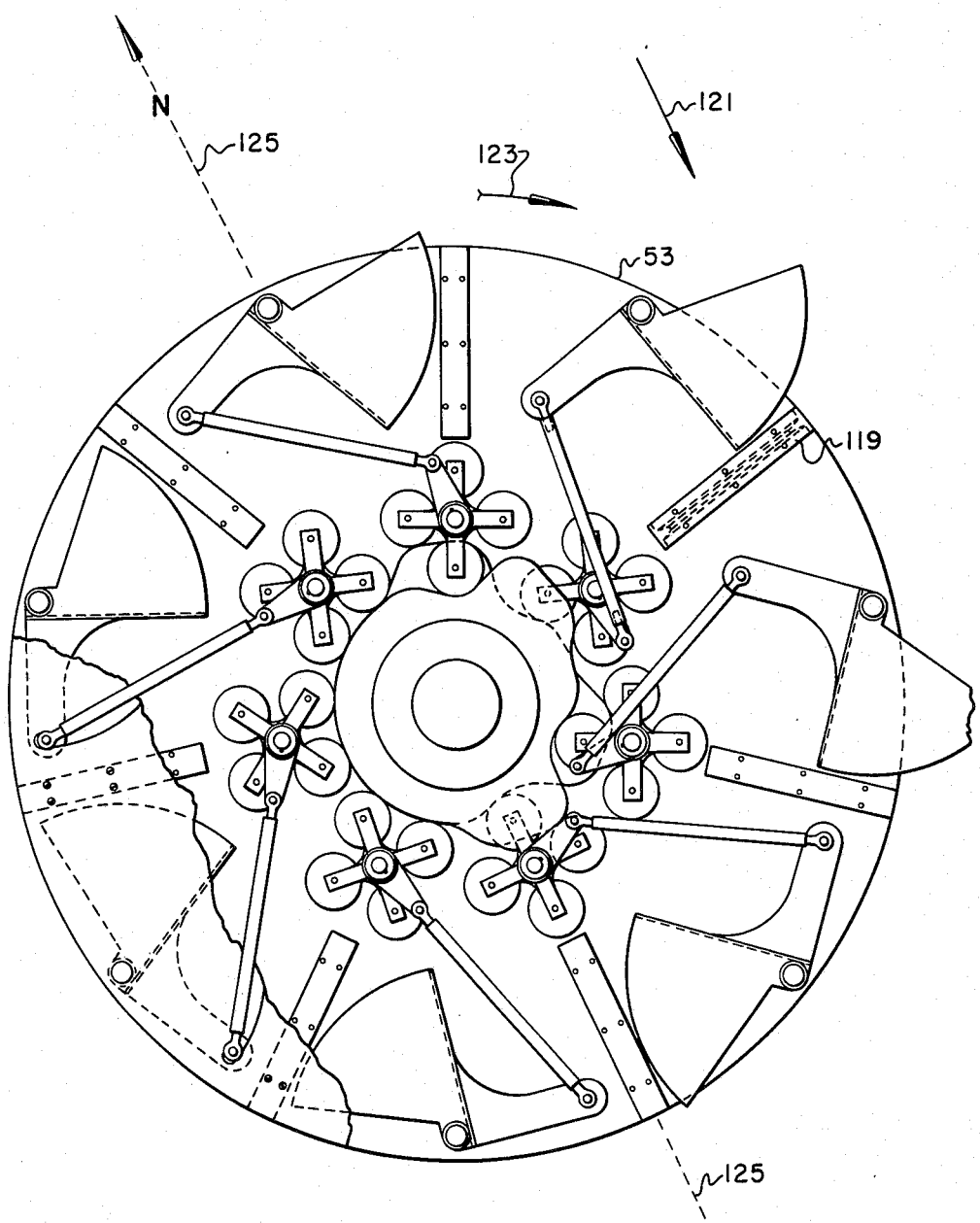
FIG. 5 is a top plan view of the interior mechanism of the apparatus of FIG. 4.
Figure 17:
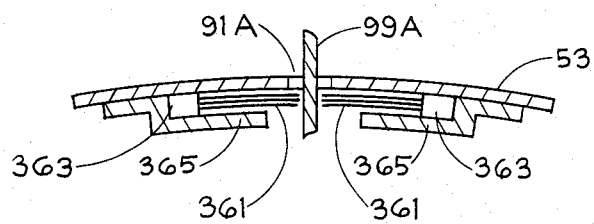
FIG. 17 illustrates brushes located on the inside of the enclosing side wall of the rotating apparatus and next to one of the slits through which one of the vanes passes.
Figure 10:
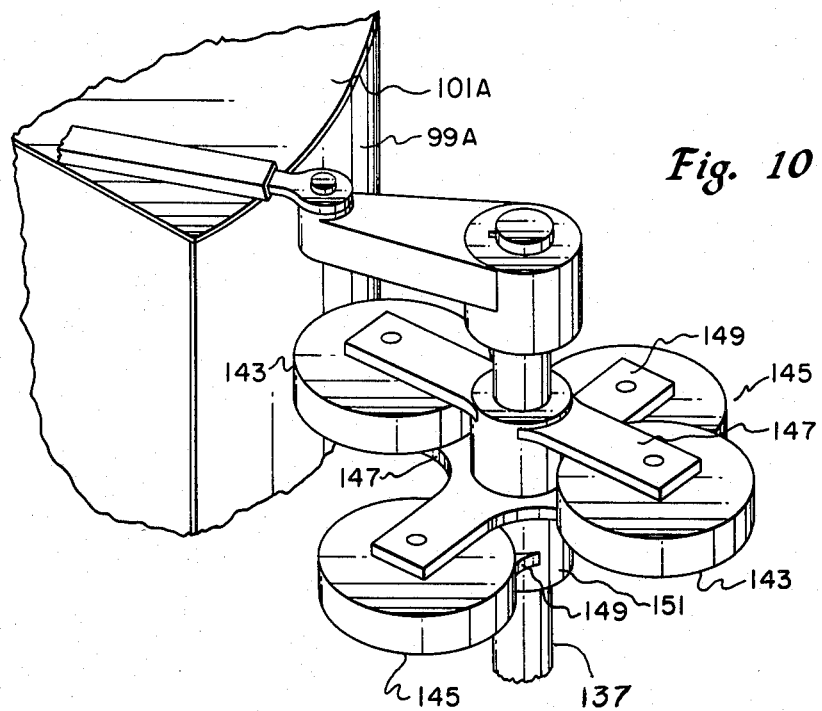
FIG. 10 is a perspective view of one of the cam followers and linkage mechanism used in the invention.
Figure 15:
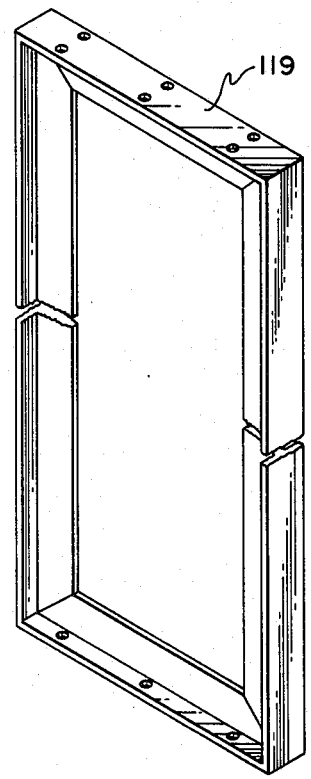
FIG. 15 illustrates one of the structural support members of the rotating apparatus of the invention.
Figure 11:
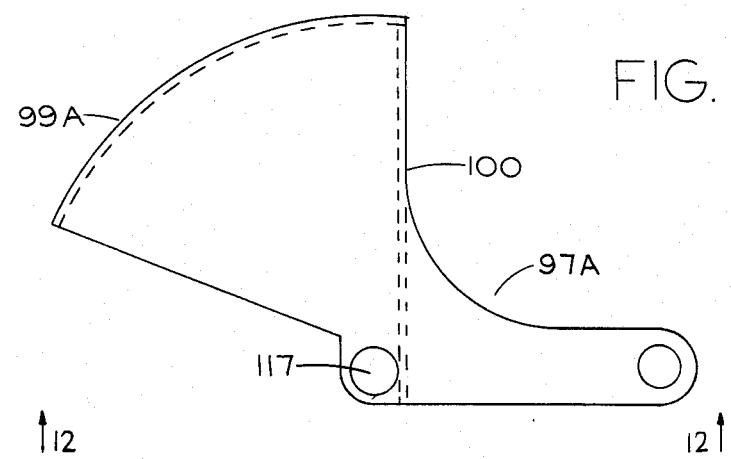
FIG. 11 is a top plan view of one of the vanes of the preferred embodiment.
Figure 12:
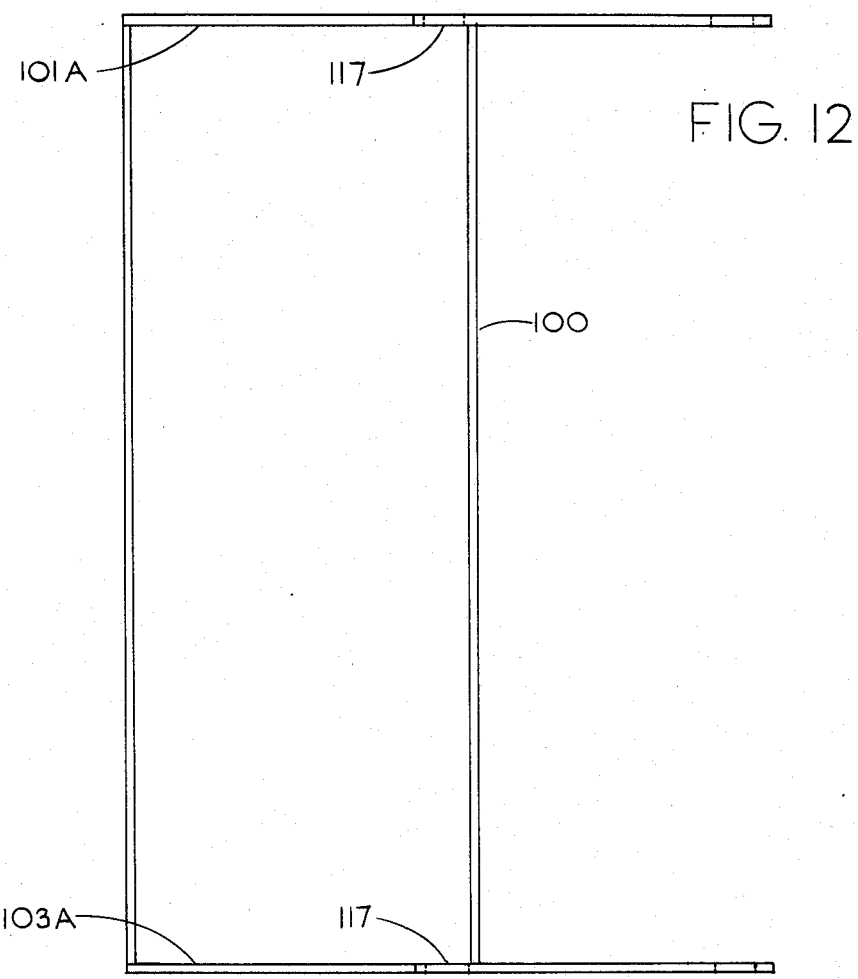
FIG. 12 is a side view of the vane of FIG. 11 as seen along the lines 12—12 thereof.

In the embodiment of FIGS. 4, 5, 10, 11, and 12, there are seven pairs of vertical spaced apart slits formed through the wall 55 and two vertical spaced apart vanes associated with each pair of slits. As shown in FIG. 4, each pair of slits are identified at 91A, 93A, 95A, and 91B, 93B, 95B. This arrangement provides much greater strength for the cylindrical wall 53 between the upper and lower plates 51 and 55 since it provides an intermediate portion 115 which has no vertical slits. In FIG. 4, one pair of vertical vanes is identified at 97A and 97B. The vanes 97A and 97B of each pair are identical and as shown, each comprises a rounded side wall 99A, a straight side wall 100 and top and bottom walls 101A and 103A. The rounded side wall 99A forms an arc of about 70°. It joins side wall 100 to form a bucket for catching the wind. The vanes 97A and 97B of each pair are fixedly connected together by a tube similar to tube 104 which in turn is pivotally coupled to plates 51 and 55 by way of bearings similar to bearings 109 and 111 for pivotal movement about a vertical axis 113 near and on the inside of wall 53 whereby the vanes 97A and 97B of each pair are moved together through their associated slits 91A, 93A, 95A and 91B, 93B, and 95B to inward and outward positions as shown in FIG. 5. The connecting tube is located in apertures 117, as shown in FIGS. 11 and 12. In FIG. 4, only one pair of vanes 97A, 97B is shown for purposes of clarity. Between adjacent pairs of vanes, rectangular frame members 119 are connected to the plates 51 and 55 and to the wall 53 as shown in FIGS. 4 and 5, to provide additional strength and support for the rotatable member 21. The frame members 119 are formed of T-shaped members as shown in FIGS. 5 and 17. The frame members 119 are shown only in partial dotted form in FIG. 4 for purposes of clarity.

A control mechanism is provided to cyclically move the vanes inward and outward once during each cycle of rotation of the member 21 in order to expose the vanes to the wind only on one side of the central axis 25 as the member 21 rotates and to position the vanes inside of the wall 53 and out of the wind while the vanes are on the other side of the axis 25. For example, referring to FIG. 5, assume that the wind is blowing from north to south as shown by the arrow 121 and the member 21 is rotating clockwise as shown by the arrow 123. During each cycle of rotation of member 21, each of the pairs of vanes 97A, 97B will be moved outward through their slits beyond the wall 53 and then inward. In FIG. 5, the vanes are shown moving outward and then inward of the wall 53 of the member 21 on the east side of the line 125. As the member 21 continues to rotate, the vanes will be moved on the inside of the wall 53 out of the wind on the west side of line 125. This arrangement minimizes resistance by the vanes to the wind on the side of the member 21 where they are ineffective in causing rotation of the member 21 thereby increasing the efficiency of the apparatus to the force of the wind.

The control mechanism of the embodiments of FIGS. 2, 3 and 9 is the same as that of the embodiments of FIGS. 4, 5, 10, 11 and 12 and operates the vanes in both embodiments in the same manner.

Referring to FIGS. 3, 5-10, 13, and 14, the control mechanism comprises an upper cam 131 and a lower cam 133 which have central apertures 131A and 133A formed therethrough. The cams 131 and 133 are located around member 77 and are fixedly secured together by an annular member 135. The cam 131 fits around the annular neck 77A of member 77 and rest on the shoulder 77B of member 77. Cam 133 fits around cylindrical support 79 in which member 77 is located and secured. Normally cams 131 and 133 will be stationary and the vanes 97 or, 97A, 97B will rotate around the two cams as the member 21 rotates.

Figure 13:
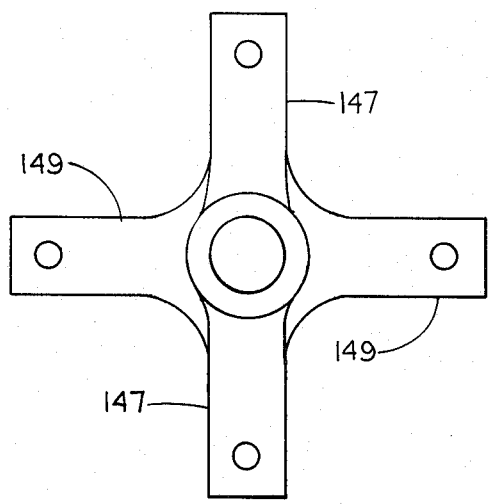
FIG. 13 is a top plan view of the cam followers supporting device of FIG. 10.
Figure 14:
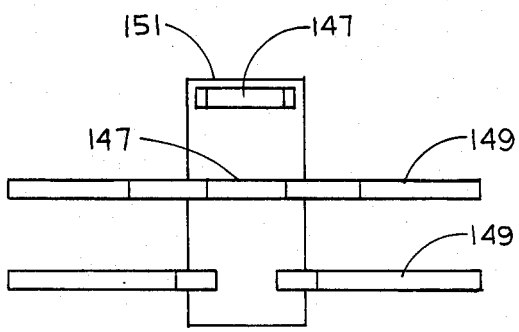
FIG. 14 is a side view of the device of FIG. 13.

Pivotally coupled to plates 51 and 55 at angular positions around the shaft 33 are seven shafts 137 each of which is associated with one vane 97 or one pair of vanes 97A, 97B. Referring to FIG. 3, each shaft 137 is coupled to plates 51 and 55 by bearings 139 and 141 whereby the shaft 137 may turn relative to plates 51 and 55 as the member 21 rotates. The shafts 137 rotate around the cams 131 and 133 as the member 21 rotates. Secured to each shaft 137 between plates 151 155 are a set of upper rollers 143 and a set of lower rollers 145. Upper rollers 143 are adapted to engage the edge of the upper cam 131 and the lower rollers 145 are adapted to engage the edge of the lower cam 133 as the member 21 rotates. Referring to FIGS. 10, 13, and 14 in the preferred embodiment, the upper rollers 143 are supported for rotation between arms 147 and the lower rollers 145 are supported for rotation between arms 149 which extend from a hub 151. Each hub 151 with its upper and lower rollers is secured to one of the shafts 137 by a key and slot arrangement whereby the hubs 151 cannot rotate relative to their shafts 137. In the embodiment of FIG. 9, the upper and lower rollers 143 and 145 are carried by the hub 151 in a slightly different manner.

The upper and lower ends of the shafts 137 extend through apertures 155 and 157 formed through plates 51, 49 and 55, 82. Attached to the top and bottom ends of each shaft 137 are two arms 161 and 163 respectively. Arms 161 and 163 are attached to each shaft 137 by a key and slot arrangement whereby the arms 161 and 163 cannot rotate relative to the shafts 137.

Upper and lower linkages 165 and 167 are pivotally coupled to the upper and lower arms 161 and 163 of each shaft 137 and to its associated vane 97 or pair of vanes 97A, 97B. In FIGS. 3 and 9, rods 171 and 173 are shown secured to arms 161 and 163 and rods 175 and 177 are shown secured to the upper and lower ends of the associated vane 97. Linkage 165 is pivotally coupled to rods 171 and 175 and linkage 167 is pivotally coupled to rods 173 and 177. Rods 175 and 177 extend through arcuate shaped apertures 176 and 178 formed through plates 51 and 55 respectively. In the embodiment of FIGS. 4 and 5, linkages 165 and 167 are pivotally coupled to the arms 161 and 163 and to the rods 175 and 177 of their associated pair of vanes 97A, 97B in a similar manner except that rod 175 is coupled to the top of vane 97A and rod 177 is coupled to the bottom of vane 97B whereby the linkages 165 and 167 are pivotally coupled to the top of vane 97A and to the bottom of vane 97B respectively.

As the member 21 rotates, the shafts 137 and their rollers 143 and 145 rotate about the cams 131 and 133 with the rollers 143 and 145 engaging the edges of the cams 131 and 133. Due to the shapes of the cams; their positions relative to each other; and the lengths, and positions and connections of the linkages 165 and 167 to the shafts 137 and to their vanes, the rollers 143 and 145, upon engaging the edges of the cams 131 and 133 as they rotate around the cams, cause the vanes to move to their inward and outward positions as the member 21 rotates as shown in FIG. 5.

Although not shown, the bottom of the main central shaft 33 will be connected to a device such as a generator for generating electricity as the member 21 and hence, the shaft 33 is rotated by the wind.

The angular position of the cams 131 and 133 can be changed relative to north or the points of the compass depending on the direction of the wind and its velocity. The angular position of the cams 131 and 133 can be changed by rotating the cams as will be described subsequently. For a given safe wind velocity range, the cams 131 and 133 will be located to move the vanes outward on one side of the axis 25 to catch the maximum force of the wind as the member 21 rotates. For the same wind velocity range, the cams 131 and 133 will be rotated to a different position if the wind direction changes to continue to allow them to catch the maximum force of the wind. If the wind velocity increases above the given safe wind velocity range, the cams 131 and 133 also will be rotated to a different position such that the vanes will catch less than the maximum force of the wind to prevent damage to the apparatus.

Figure 6:
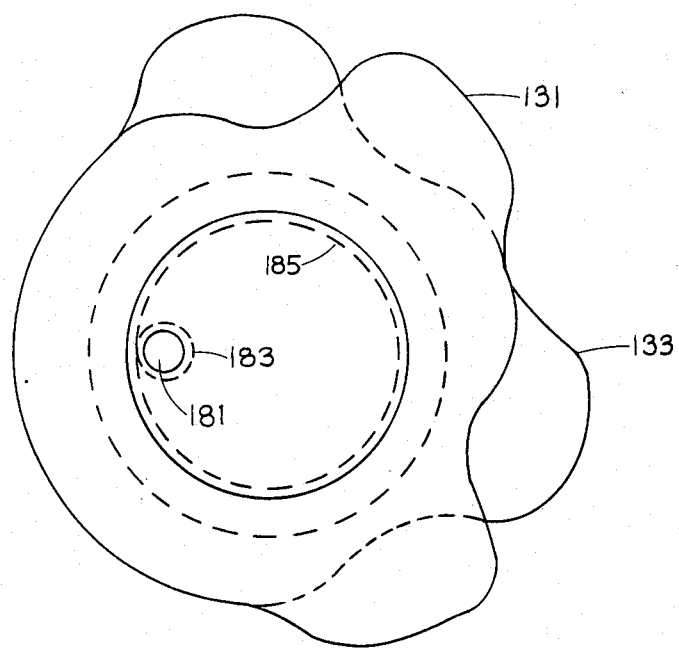
FIG. 6 is a top plan view of the central upper and lower cams of the invention.

Referring to FIGS. 2, 3, and 6, the mechanism for changing the angular position of the cams 131 and 133 comprises a rod 181 having gear teeth 183 at its upper end which mesh with gear teeth 185 formed on the inside of the upper cam 131. The upper end of the rod 181 extends through an aperture formed through member 77 to the cam 131 as shown in FIG. 3 and its lower end is connected to the shaft of an electric motor 187 as shown in FIG. 2. Although not shown, suitable bearing supports for the rod 181 are provided. Operation of the motor 187 rotates the rod 181 which causes the cam 131 and hence, the cam 133 to be rotated to different angular positions. Although not shown, bearings are provided for supporting cams 131 and 133 for rotation about members 77 and 79. The shaft of the motor 187 can be rotated in either direction.

Figure 16:
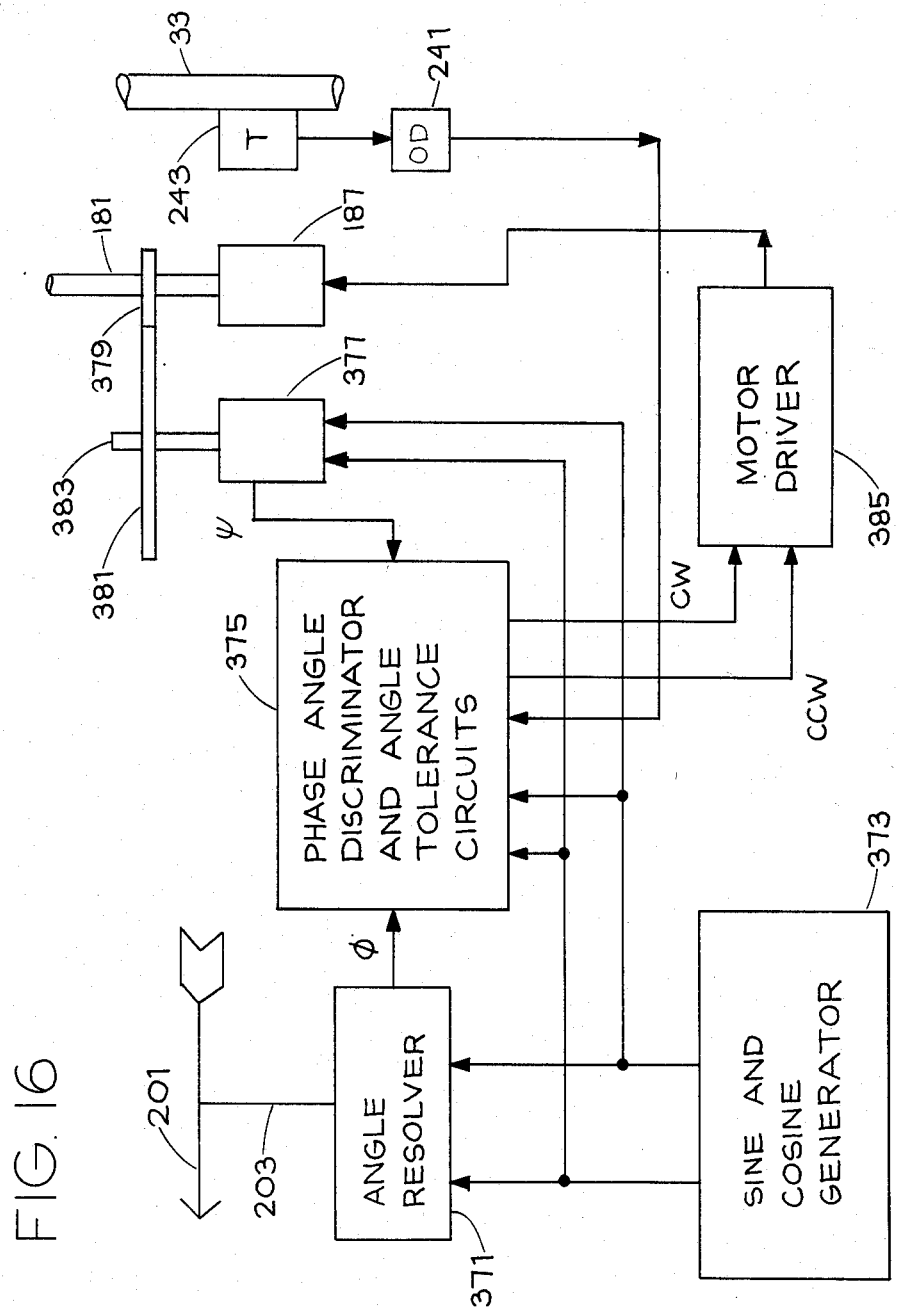
FIG. 16 illustrates an electronic system for changing the angular position of the central cams and an over speed detector.

Referring now to FIG. 16, there will be described an electronic system for changing the angular positions of the central cams 131 and 133 as the wind direction or velocity changes. The system comprises an angle resolver 371 coupled to a shaft 203 of a wind direction vane 201. A sine and cosine generator 373 produces sine and cosine signals which are applied to the angle resolver 371, to a phase angle discriminator and angle tolerance circuit 375 and to a second angle resolver 377 which is the same as angle resolver 371. The angle resolver 371 produces a signal $\phi$ which is a function of the angular position of the wind direction vane 201 and which has an angular relationship to the sine signal produced by generator 373. The circuit 375 compares the sine signal with $\phi$ to determine the wind direction. Shaft 181 has a gear 379 which engages a gear system 381 of a shaft 383 which is coupled to the angel resolver 377. The ratio of gears 379 and 381 is the same as that of gears 183 and 185. Angle resolver 377 produces a signal $\Omega$ which is a function of the angular position of gears 381 and 379 and hence of the cams 131 and 133. The circuit 375 compares $\phi$ and $\Omega$ and determines the direction that shaft 181 and hence cams 131 and 133 need to be turned to cause the vanes 97 or vane pairs 97A, 97B to receive the maximum force of the wind as member 21 rotates. The circuit 375 produces clockwise or counter clockwise signals CW or CCW which is applied to a motor driver 385 which in turn causes the motor 187 to turn the shaft 181 the correct amount in the correct direction. The signals CW or CCW will not be produced if wind is blowing from the proper direction and its velocity is within a safe velocity range. Preferably, the circuit 375 will be unresponsive to wind direction changes within a suitable preset angular "window" in order to prevent motor 187 from operating constantly. When the wind direction is inside of this window, CW or CCW will not be produced. When the wind changes to directions outside of this window, CW or CCW will be produced.

An overspeed detector 241 is coupled to tachometer 243 and produces a $\Delta \phi$ signal if the wind velocity is above a given value. This signal is applied to circuit 375 which produces CW or CCW to cause motor 187 to rotate shaft 181 and hence cams 13 and 133 to proper amount to cause vanes 97 or vane pairs 97A, 97B to receive less wind as member 21 rotates.

Referring to FIG. 17, there are illustrated brushes 361 secured on the inside of the cylindrical wall 53 on opposite sides of each slit portion through which the vanes 97 or vane pairs 97A, 97B extend. The brushes engage the arcuate portion of the vanes and their purpose is to prevent wind or air from entering the inside of the cylinder 53. As shown, each of the brushes 361 is secured to a base 363 which is held in place by a structural member 365 secured to the inside of cylindrical wall 53.

Figure 7:
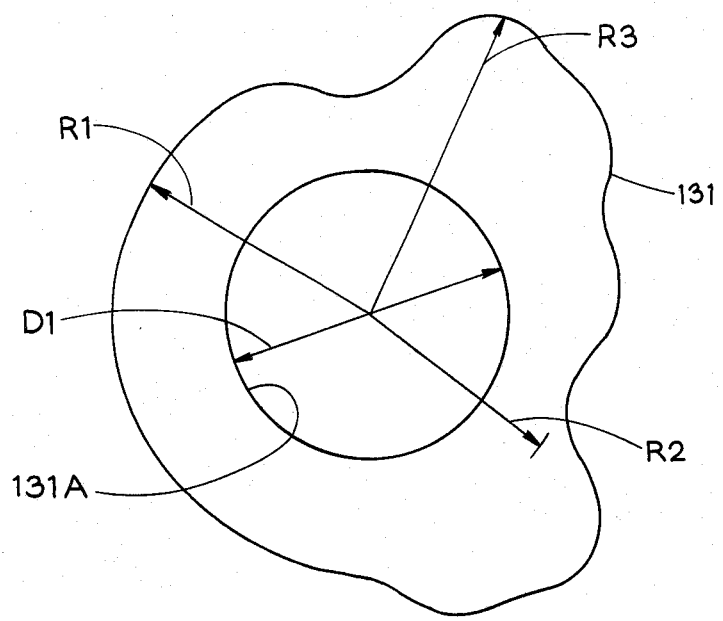
FIG. 7 is a top plan view of the upper cam of FIG. 6.
Figure 8:
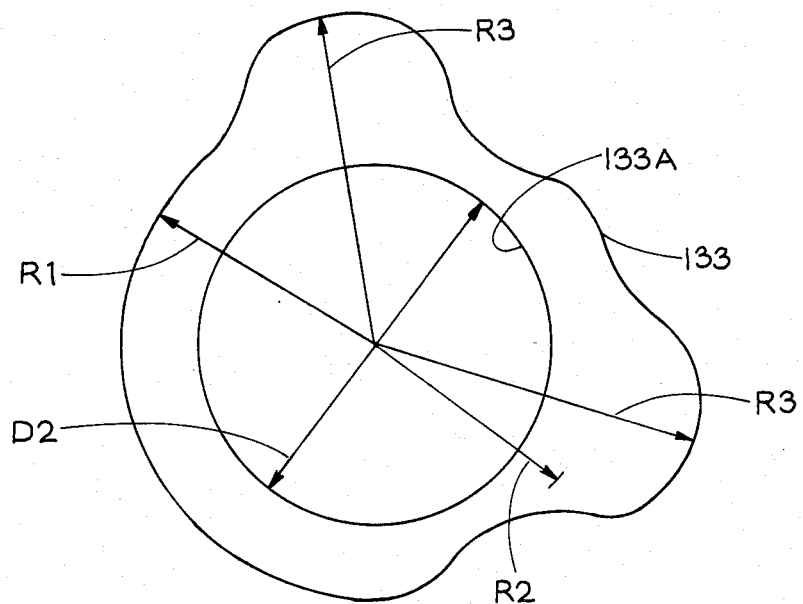
FIG. 8 is a top plan view of the lower cam of FIG. 6.

Referring to FIGS. 7 and 8, in one embodiment, radius $R_1$ is equal to 13.005 inches, $R_2$ is equal to 11.100 inches, and $R_3$ is equal to 16.865 inches. Diameter $D_1$ is equal to 14.332 inches and diameter $D_2$ is equal to 18.250 inches. When the rollers 143 and 145 engage the edges of the portions of the cams 131 and 133 having the radius $R_1$, the vanes 97 or vane pairs 97A, 97B are located on the inside of the wall 53. In one embodiment, cylindrical member 31 may have a diameter of 8 feet. It is to be understood that the apparatus may have more or less than seven vanes 97 or vane pairs 97A, 97B.

I claim:
1. A wind operated apparatus, comprising:
a frame,
support means for supporting said frame for rotation about a generally vertical axis,
an enclosing side wall supported by said frame for rotation about said generally vertical axis, said enclosing side wall forming an interior chamber shielded from the wind, a plurality of openings formed through said enclosing side wall at spaced apart positions around said enclosing side wall, a plurality of vane means supported by said frame at spaced apart positions around said enclosing side wall and near said enclosing side wall for causing said frame and said enclosing side wall to be rotated by the wind, each of said vane means being associated with one of said openings, each vane means being supported for pivotal movement relative to said frame about a pivot axis such that it may be moved through its associated opening between inward and outward positions on opposite sides of said enclosing side wall, said pivot axes being located inward of said enclosing side wall, cam means supported by said support means at said generally vertical axis, a plurality of cam follower means coupled to said frame for rotation therewith and for engaging said cam means as said frame rotates, the number of said cam follower means being equal to the number of said vane means, each of said cam follower means being associated with one of said vane means, and linkage means pivotally coupled to each of said cam follower means and to its associated vane means, for cyclically moving each of said vane means to its inward and outward positions as said frrame rotates such that on one side of said generally vertical axis said vane means are moved to their outward positions as said vane means are rotated by said frame to said one side and on the opposite side of said generally vertical axis said vane means are moved to their inward positions as said vane means are rotated by said frame to said opposite side.

2. The apparatus of claim 1, wherein:

said enclosing side wall is cylindrical in shape, and a top wall is connected to the top of said cylindrical shaped enclosing side wall.

3. The apparatus of claim 1 wherein:

said cam means comprises first and second cams located at said generally vertical axis at different levels, each of said cam follower means comprising first and second roller means supported by a shaft and located at different levels for engaging said first and second cams respectively as said frame rotates to cause pivotal movement of said shaft, each of said linkage means being pivotally coupled to its associated cam follower means and to its associated vane means.

4. The apparatus of claim 1, comprising:

operating means for rotating said cam means about said generally vertical axis, said support means supports said cam means for rotation about said generally vertical axis, sensing means for sensing the direction of the wind, and means responsive to the change in the direction of the wind as sensed by said sensing means for actuating said operating means for rotating said cam means about said generally vertical axis to another position for changing the positions relative to said generally vertical axis to which said vane means are moved to their inward and outward positions as said frame rotates.

5. A wind operated apparatus, comprising:

a frame, support means for supporting said frame for rotation about a central vertical axis, an enclosing side wall supported by said frame for rotation about said central vertical axis, said enclosing side wall forming an interior chamber shielded from the wind, a plurality of vertical slit means formed through said side wall at spaced apart positions around said enclosing side wall supported by said frame, a plurality of vane means supported by said frame at spaced apart positions around said enclosing side wall and near said enclosing side wall for causing said frame and said enclosing side wall to be rotated by the wind, the number of said vane means being equal to the number of said vertical slit means, each of said vane means being associated with one of said vertical slit means, each vane means being supported for pivotal movement relative to said frame about a vertical pivot axis located near and inward of said enclosing side wall such that it may be moved through its associated vertical slit means between an inward position inside of said enclosing side wall and an outward position wherein said vane means extends outward beyond said enclosing side wall, cam means supported by said support means at said central vertical axis, a plurality of cam follower means coupled to said frame for rotation therewith and for engaging said cam means as said frame rotates, the number of said cam follower means being equal to the number of said vane means, each of said cam follower means being associated with one of said vane means, and linkage means pivotally coupled to each of said cam follower means and to its associated vane means for cyclically moving each of said vane means to its inward and outward positions as said frame rotates such that on one side of said central vertical axis said vane means are moved to their outward positions as said vane means are rotated by said frame to said one side and on the opposite side of said central vertical axis said vane means are moved to their inward positions as said vane means are rotated by said frame to said opposite side.

6. The wind operated apparatus of claim 1, wherein:

said cam means comprises a surface shaped such that it may be engaged by a plurality of said cam follower means at the same time to cause their associated vane means to be located at their inward positions and which surface prevents said vane means from moving relative to said frame when said surface is engaged by said cam follower means of said vane means.

7. The wind operated apparatus of claim 6, wherein:

said support means supports said cam means for rotation about said generally vertical axis, operating means for rotating said cam means about said generally vertical axis, sensing means for sensing the direction of the wind, and means responsive to the change in the direction of the wind as sensed by said sensing means for actuating said operating means for rotating said cam means about said generally vertical axis to another position for changing the positions relative to said generally vertical axis at which said vane means are moved to their inward and outward positions as said frame rotates.

8. The wind operated apparatus of claim 1, wherein:

said cam means comprises a circular portion at a given radius from said generally vertical axis and other portions at different radii from said generally vertical axis, said circular portion of said cam means being sufficient such that it may be engaged and followed by a plurality of said cam follower means at the same time, when each of said cam follower means engages said circular portion of said cam means, its associated vane means is prevented from moving through its associated opening.

9. The wind operated apparatus of claim 8, wherein:

said support means supports said cam means for rotation about said generally vertical axis, operating means for rotating said cam means about said generally vertical axis, sensing means for sensing the direction of the wind, and means responsive to the change in the direction of the wind as sensed by said sensing means for actuating said operating means for rotating said cam means about said generally vertical axis to another position for changing the positions relative to said generally vertical axis at which said vane means are moved to their inward and outward positions as said frame rotates.

10. The wind operated apparatus of claim 1, comprising:

a top wall connected to the top end of said enclosing side wall above said vane means, a bottom wall connected to the bottom end of said enclosing side wall below said vane means, said bottom wall having a central opening, said support means comprises a stationary member extending upward through said central opening of said bottom wall into said interior chamber, said cam means being supported by said support means within said interior chamber for rotation about said generally vertical axis, operating means coupled to said cam means within said interior chamber for rotating said cam means about said generally vertical axis, sensing means for sensing the direction of the wind, and means responsive to the change in the direction of the wind as sensed by said sensing means for actuating said operating means for rotating said cam means about said generally vertical axis to another position for changing the positions relative to said generally vertical axis at which said vane means are moved to their inward and outward positions as said frame rotates.

11. The wind operated apparatus of claim 10, comprising:

teeth formed on said cam means, said operating means comprises a rod means extending upward through said opening of said bottom wall, said rod means having teeth which engage said teeth of said cam means such that rotation of said rod means causes said cam means to rotate about said generally vertical axis, drive means for rotating said rod means, said means responsive to the change in the direction of the wind as sensed by said sensing means actuates said drive means for rotating said rod means and hence said cam means about said generally vertical axis for changing the positions relative to said generally vertical axis at which said vane means are moved to their inward and outward positions as said frame rotates.

12. The wind operated apparatus of claim 1, wherein:

said cam means comprises first and second cams fixed relative to each other and supported by said support means at different levels, each of said first and second cams comprises a circular portion having a given radius from its axis coinciding with that of said generally vertical axis and two enlarged portions having radii from the axis of said cam greater than that of said given radius, said first and second cams being fixed such that their circular portions are in alignment and their two enlarged portions predominantly are out of alignment, each of said cam follower means comprises first and second sets of rollers supported by structure connected to a shaft supported by said frame for pivotal movement relative to said frame, said first and second set of rollers being located at different levels for engaging said first and second cams respectively as said frame rotates to cause pivotal movement of said shaft, said linkage means associated with each cam follower means being pivotally coupled to its shaft and to its associated vane means.

13. The wind operated apparatus of claim 10, wherein:

said cam means comprises first and second cams fixed relative to each other and supported by said support means at different levels, each of said first and second cams comprises a circular portion having a given radius from its axis coinciding with that of said generally vertical axis and two enlarged portions having radii from the axis of said cam greater than that of said given radius, said first and second cams being fixed such that their circular portions are in alignment and their two enlarged portions predominantly are out of alignment, each of said cam follower means comprises first and second sets of rollers supported by structure connected to a shaft supported by said frame for pivotal movement relative to said frame, said first and second set of rollers being located at different levels for engaging said first and second cams respectively as said frame rotates to cause pivotal movement of said shaft, said linkage means associated with each cam follower means being pivotally coupled to its shaft and to its associated vane means.

14. A wind operated apparatus, comprising:

a frame, support means for supporting said frame for rotation about a vertical axis, a cylindrical wall supported by said frame for rotation about said vertical axis, cam means having an axis coinciding with said vertical axis, said cam means having a circular portion at a given radius from its axis and other portions at different radii from it axis, a plurality of openings formed through said cylindrical wall at spaced apart angular positions around said wall, a plurality of vane means located at spaced apart angular positions around said frame near said cylindrical wall for causing said frame and said cylindrical wall to be rotated by the wind, each of said vane means being assciated with one of said openings, eacha vane means being supported by said frame for pivotal movement about its own pivot axis relative to said frame and said cylindrical wall such that it may be moved through its associated opening between inward and outward positions on opposite sides of said cylindrical wall, said pivot axes of said vane means being located at the same radius from said vertical axis, a plurality of cam follower means coupled to said frame for rotation therewith and for engaging said cam means as said frame rotates, each of said cam follower means being supported by said frame for rotation about its own axis relative to said frame, said axes of said cam follower means being located at the same radius from said vertical axis, the number of said cam follower means being equal to the number of said vane means, each of said cam follower means being associated with one of said vane means, linkage means pivotally coupled to each of said cam follower means and to its associated vane means such that as said frame means and said cylindrical wall are rotated about said cam means, said cam follower means and said linkage means cause said vane means to be pivoted outward through their associated openings when said cam follower means engage said other portions of said cam means and then to be pivoted inward through their openings as said cam follower means engage said circular portion of said cam means, said circular portion of said cam means being sufficient such that a plurality of said cam follower means may engage and follow said circular portion of said cam means at the same time, when each of said cam follower means engage said circular portion of said cam means, its associated vane means is prevented from moving outward through its associated opening.

15. The wind operated apparatus of claim 14, wherein:

said circular portion and said other portions of said cam means being formed such that each of said cam follower means and its associated linkage means cause its associated vane means to be cyclically moved to its inward and outward positions as said frame rotates such that on one side of said vertical axis said vane means and moved to their outward positions as said vane means are rotated by said frame means to said one side and on the opposite side of said vertical axis said vane means are moved to their inward positions as said vane means are rotated by said frame to said opposite side.

16. The wind operated apparatus of claim 14, wherein:

said cam means comprises first and second cams located at different levels, each of said cam follower means comprises first and second roller means supported at different levels for engaging said first and second cams respectively.

17. The wind operated apparatus of claim 14, wherein:

said support means supports said cam means for rotation about said vertical axis, operating means for rotating said cam means about said vertical axis, sensing means for sensing the direction of the wind, and means responsive to the change in the direction of the wind as sensed by said sensing means for actuating said operating means for rotating said cam means about said vertical axis to another position for changing the positions relative to said vertical axis at which said vane means are moved to their inward and outward positions as said frame rotates.

18. The wind operated apparatus of claim 17, wherein:

said cam comprises first and second cams located at different levels, each of said cam follower means comprises first and second roller means supported at different levels for engaging said first and second cam respectively.

19. The wind operated apparatus of claim 15, comprising:

operating means for rotating said cam means about said vertical axis, sensing means for sensing the direction of the wind, and means responsive to the change in the direction of the wind as sensed by said sensing means for actuating said operating means for rotating said cam means about said vertical axis to another position for changing the positions relative to said vertical axis at which said vane means are moved to their inward and outward positions as said frame rotates, said cam means being held stationary until rotated by said operating means.

20. The wind operated apparatus of claim 19, wherein:

said cam means comprises first and second cams located at different levels, each of said cam follower means comprises first and second roller means supported at different levels for engaging said first and second cams respectively.

21. The wind operated apparatus of claim 14, comprising:

a top wall connected to the top end of said cylindrical wal above said vane means, a bottom wall connected to the bottom end of said cyclindrical wall below said vane means, said cylindrical wall, top wall, and bottom wall forming an interior chamber shielded from the wind, said bottom wall having a central opening, said support means comprises a stationary member extending upward through said central opening of said bottom wall into said interior chamber, said cams means being supported by said support means within said interior chamber for rotation about said vertical axis, operating means coupled to said cam means within said interior chamber for rotating said cam means about said vertical axis, sensing means for sensing the direction of the wind, and means responsive to the change in the direction of the wind as sensed by said sensing means for actuating said operating means for rotating said cam means about said vertical axis to another position for changing the positions relative to said vertical axis at which said vane means are moved to their inward and outward positions as said frame rotates.

22. The wind operated apparatus of claim 21, comprising:

teeth formed on said cam means, said operating means comprises a rod means extending upward through said opening of said bottom wall, said rod means having teeth which engage said teeth of said cam means such that rotation of said rod means causes said cam means to rotate about said vertical axis, drive means for rotating said rod means, said means responsive to the change in the direction of the wind as sensed by said sensing means actuates said drive means for rotating said rod means and hence said cam means about said vertical axis for changing the positions relative to said vertical axis at which said vane means are moved to their inward and outward positions as said frame rotates.

23. The wind operated apparatus of claim 21, wherein:

said circular portion and said other portions of said cam means being formed such that each of said cam follower means and its associated linkage means cause its associated vane means to be cyclically moved to its inward and outward positions as said frame rotates such that on one side of said vertical axis said vane means are moved to their outward positions as said vane means are rotated by said frame means to said one side and on the opposite side of said vertical axis said vane means are moved to their inward positions as said vane means are rotated by said frame to said opposite side.

24. The wind operated apparatus of claim 14, wherein:

said cam means comprises first and second cams fixed relative to each other and supported by said support means at different levels, each of said first and second cams comprises a circular portion having a given radius from its axis coinciding with that of said vertical axis and two enlarged portions having radii from the axis of said cam greater than that of said given radius, said first and second cams being fixed such that their circular portions are in alignment and their two enlarged portions predominantly are out of alignment, each of said cam follower means comprises first and second sets of rollers supported by structure connected to a shaft supported by said frame for pivotal movement relative to said frame, said first and second set of rollers being located at different levels for engaging said first and second cams respectively as said frame rotates to cause pivotal movement of said shaft, said linkage means associated with each cam follower means being pivotally coupled to its shaft and to its associated vane means.

25. The wind operated apparatus of claim 24, wherein:

said circular portions and said enlarged portions of said cam means cause each of said cam follower means and its associated linkage means to move its associated vane means cyclically to its inward and outward portions as said frame rotates such that on one side of said vertical axis said vane means are moved to their outward positions as said vane means are rotated by said frame means to said one side and on the opposite side of said vertical axis said vane means are moved to their inward positions as said vane means are rotated by said frame to said opposite side.

26. The wind operated apparatus of claim 21, wherein:

said cam means comprises first and second cams fixed relative to each other and supported by said support means at different levels, each of said first and second cams comprises a circular portion having a given radius from its axis coinciding with that of said vertical axis and two enlarged portions having radii from the axis of said cam greater than that of said given radius, said first and second cams being fixed such that their circular portions are in alignment and their two enlarged portions predominantly are out of alignment, each of said cam follower means comprises first and second sets of rollers supported by structure connected to a shaft supported by said frame for pivotal movement relative to said frame, said first and second set of rollers being located at different levels for engaging said first and second cams respectively as said frame rotates to cause pivotal movement of said shaft, said linkage means associated with each cam follower means being pivotally coupled to its shaft and to its associated vane means.

27. The wind operated apparatus of claim 26, wherein:

said circular portions and said enlarged portions of said cam means cause each of said cam follower means and its associated linkage means to move its associated vane means cyclically to its inward and outward positions as said frame rotates such that on one side of said vertical axis said vane means are moved to their outward positions as said vane means are rotated by said frame means to said one side and on the opposite side of said vertical axis said vane means are moved to their inward positions as said vane means are rotated by said frame to said opposite side.

28. The wind operated apparatus of claim 27, comprising:

teeth formed on said cam means, said operating means comprises a rod means extending upward through said opening of said bottom wall, said rod means having teeth which engage said teeth of said cam means such that rotation of said rod means causes said cam means to rotate about said vertical axis, drive means for rotating said rod means, said means responsive to the change in the direction of the wind as sensed by said sensing means actuates said drive means for rotating said rod means and hence said cam means about said vertical axis for changing the positions relative to said vertical axis at which said vane means are moved to their inward and outward positions as said frame rotates.

29. The apparatus of claim 28, wherein:
each of said vane means comprises:
a curved side wall and upper and bottom walls connected to the upper and lower ends of said curved side wall,
the pivot axis of each vane means extends through its upper and bottom walls and is spaced from its curved side wall,
each of said openings in said cylindrical wall comprises a vertical slit and horizontal slits extending from the top and bottom of the vertical slit forming a generally C-shaped opening to allow its associated vane to be moved therethrough between its inward and outward positions.

30. The wind operated apparatus of claim 29, wherein:
each of said first and second cams are annular in shape and are supported for rotation around said stationary member of said support means,
said teeth of said cam means being formed on the inner edge of one of said cams.

31. The wind operated apparatus of claim 30, wherein:
the centers of adjacent rollers of said first and second sets of rollers of each of said cam follower means are spaced about 90° apart relative to the shaft of each of said cam follower means.

* * * * *